United States Patent
Yamaguchi et al.

(10) Patent No.: US 9,197,085 B2
(45) Date of Patent: Nov. 24, 2015

(54) CONTROL DEVICE FOR VEHICLE

(75) Inventors: Kazuhiro Yamaguchi, Obu (JP);
Noritake Mitsutani, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 153 days.

(21) Appl. No.: 14/112,506

(22) PCT Filed: Apr. 20, 2011

(86) PCT No.: PCT/JP2011/059723
§ 371 (c)(1),
(2), (4) Date: Oct. 17, 2013

(87) PCT Pub. No.: WO2012/144032
PCT Pub. Date: Oct. 26, 2012

(65) Prior Publication Data
US 2014/0042983 A1    Feb. 13, 2014

(51) Int. Cl.
*H02J 7/00* (2006.01)
*H01M 10/46* (2006.01)
(Continued)

(52) U.S. Cl.
CPC ............. *H02J 7/0036* (2013.01); *B60L 11/123* (2013.01); *B60L 11/14* (2013.01); *B60L 11/1816* (2013.01); *H01M 10/44* (2013.01); *H01M 10/46* (2013.01); *H02J 7/0029* (2013.01); *B60L 3/00* (2013.01); *B60L 11/1848* (2013.01); *B60L 2210/30* (2013.01); *B60L 2210/40* (2013.01); *B60L 2220/14* (2013.01); *B60L 2240/527* (2013.01); *B60L 2240/80* (2013.01); *H01M 2010/4271* (2013.01); *H02J 7/0077* (2013.01); *H02J 7/027* (2013.01); *H02J 7/045* (2013.01); *Y02T 10/6217* (2013.01);

*Y02T 10/7005* (2013.01); *Y02T 10/7077* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ........ H02J 7/0081; H02J 7/045; H02J 7/0029
See application file for complete search history.

(56) References Cited

U.S. PATENT DOCUMENTS 7,872,450 B1 *    1/2011    Cohen et al. .................. 320/134
2006/0108986 A1   5/2006    Funabashi et al.
(Continued)

FOREIGN PATENT DOCUMENTS

JP    07-123599 A    5/1995
JP    2005-253283 A    9/2005
(Continued)

*Primary Examiner* — Richard Isla Rodas
*Assistant Examiner* — Gardy J Lacombe
(74) *Attorney, Agent, or Firm* — Sughrue Mion, PLLC

(57) ABSTRACT

In a vehicle including a charge circuit for carrying out external charging to charge a vehicle-mounted battery with a power supply external to the vehicle, a vehicle ECU. determines that there is an impedance error when a state where a reduction width of an input voltage Vin applied to the charge circuit from the power supply external to the vehicle is exceeding a threshold width ΔV continues for a predetermined time, and outputs a first termination instruction to a charger ECU. The charger ECU receiving the first termination instruction causes the charge circuit to stop to terminate external charging. The charger ECU controls the charge circuit such that, when the input voltage Vin falls down to a threshold voltage V1 the current flowing through an external power supply system is reduced to suppress further reduction in the input voltage Vin.

6 Claims, 6 Drawing Sheets

(51) Int. Cl.
*H01M 10/44* (2006.01)
*B60L 11/12* (2006.01)
*B60L 11/14* (2006.01)
*H01M 10/42* (2006.01)
*B60L 3/00* (2006.01)
*B60L 11/18* (2006.01)
*H02J 7/02* (2006.01)
*H02J 7/04* (2006.01)

(56) References Cited

U.S. PATENT DOCUMENTS

2010/0289516 A1* 11/2010 Mitsutani et al. ........ 324/764.01
2011/0234159 A1* 9/2011 Ohtomo et al. ............... 320/109
2012/0139490 A1* 6/2012 Ishii ............................. 320/109
2012/0166026 A1* 6/2012 Gale et al. ....................... 701/22

FOREIGN PATENT DOCUMENTS

| | | |
|---|---|---|
| JP | 2006129619 A | 5/2006 |
| JP | 2010-142088 A | 6/2010 |
| JP | 2010183672 A | 8/2010 |
| JP | 2010-220299 A | 9/2010 |
| JP | 2011-015581 A | 1/2011 |
| JP | 2011-072088 A | 4/2011 |

* cited by examiner

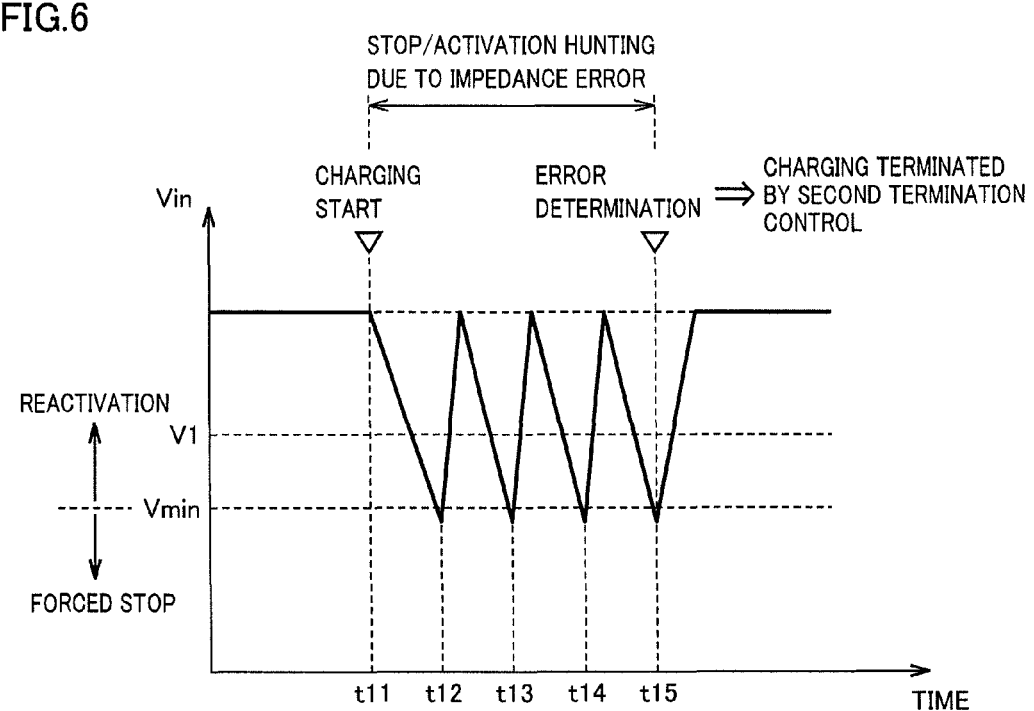

CONTROL DEVICE FOR VEHICLE

CROSS REFERENCE TO RELATED APPLICATIONS

This is a National Stage of International Application No. PCT/JP2011/059723, filed Apr. 20, 2011, the contents of all of which are incorporated herein by reference in their entirety.

TECHNICAL FIELD

The present invention relates to control of a vehicle including a charge circuit for carrying out external charging in which a vehicle-mounted power storage device is charged with electric power from a power supply external to the vehicle.

BACKGROUND ART

Japanese Patent Laying-Open No. 2010-220299 (PTL 1) discloses a vehicle including a charge circuit for carrying out external charging in which a vehicle-mounted power storage device is charged with electric power from a power supply external to the vehicle, directed to the technique of estimating the impedance at a charge path based on an amount of reduction of voltage input to the charge circuit (hereinafter, also simply referred to as "input voltage") from a power supply during external charging, and stopping the external charging when an erroneous state of the estimated impedance exceeding a reference value occurs.

CITATION LIST

Patent Literature

PTL 1: Japanese Patent Laying-Open No. 2010-220299
PTL 2: Japanese Patent Laying-Open No. 2010-142088
PTL 3: Japanese Patent Laying-Open No. 7-123599

SUMMARY OF INVENTION

Technical Problem

If the amount of reduction in input voltage caused by increase in impedance at the charge path is great, there may be the case where the input voltage becomes lower than the lower limit value of the operating voltage of the charge circuit during external charging to cause the charge circuit to be disabled. If current does not flow to the charge path due to such operation of the charge circuit being stopped, the input voltage will not drop and will return to the normal value even when the impedance at the charge path is high. Therefore, there is a possibility of not being able to properly determine an impedance error based on the amount of reduction in the input voltage.

In view of the foregoing, an object of the present invention is to determine accurately an impedance error at a charge path based on the amount of reduction in the input voltage applied to a charge circuit from a power supply external to a vehicle.

Solution to Problem

A control device according to the present invention controls a vehicle including a power storage device, and a charge circuit for carrying out external charging in which the power storage device is charged with a power supply external to the vehicle. The charge circuit stops when an input voltage applied to the charge circuit from the power supply drops to become lower than a lower limit voltage value at which the charge circuit can operate. The control device includes a suppression unit executing suppression control for suppressing a drop of the input voltage before the input voltage becomes lower than the lower limit voltage value during external charging, and a first charge termination unit determining whether an impedance error is occurring at the charge path based on a reduction width of the input voltage during external charging, and terminating external charging when a determination is made that an impedance error is occurring.

Preferably, the suppression control is directed to reducing the current flowing through the charge path when the input voltage drops down to a threshold voltage higher than the lower limit voltage value during external charging.

Preferably, the first charge termination unit determines that an impedance error is occurring when a state where the reduction width of the input voltage is exceeding a threshold width continues for a predetermined time during external charging.

Preferably, the charge circuit is activated when the input voltage returns to a level greater than or equal to the lower limit voltage value. The control device further includes a second charge termination unit determining that there is an impedance error, when stopping and activation of the charge circuit are repeated, to terminate external charging.

Preferably, the second charge termination unit determines that there is an impedance error, when the input voltage is reduced during external charging and a count of the charge circuit stopping within a predetermined time starting from reduction in the input voltage exceeds a predetermined count, to terminate external charging.

Preferably, the control device further includes a notification unit notifying the user about the impedance error.

A control device according to another aspect of the present invention controls a vehicle including a power storage device and a charge circuit for carrying out external charging in which the power storage device is charged with a power supply external to the vehicle. The charge circuit stops when the input voltage applied to the charge circuit from the power supply drops to become lower than a lower limit voltage value at which the charge circuit can operate, and is activated when the input voltage returns to a level greater than or equal to the lower limit voltage value. The control device includes a monitor unit monitoring a state of the charge circuit, and a charge termination unit determining that there is an impedance error at the charge path, when activation and stopping of the charge circuit are repeated, to terminate external charging.

Preferably, the charge termination unit determines that there is an impedance error, when the input voltage is reduced during external charging and a count of the charge circuit stopping within a predetermined time starting from reduction in the input voltage exceeds a predetermined count, to terminate external charging.

Advantageous Effects of Invention

According to the present invention, an impedance error at a charge path can be determined accurately based on the amount of reduction in an input voltage applied to a charge circuit from a power supply external to a vehicle.

BRIEF DESCRIPTION OF DRAWINGS

FIG. 6 is a second diagram representing temporal change in input voltage Vin.

DESCRIPTION OF EMBODIMENTS

Figure 1:
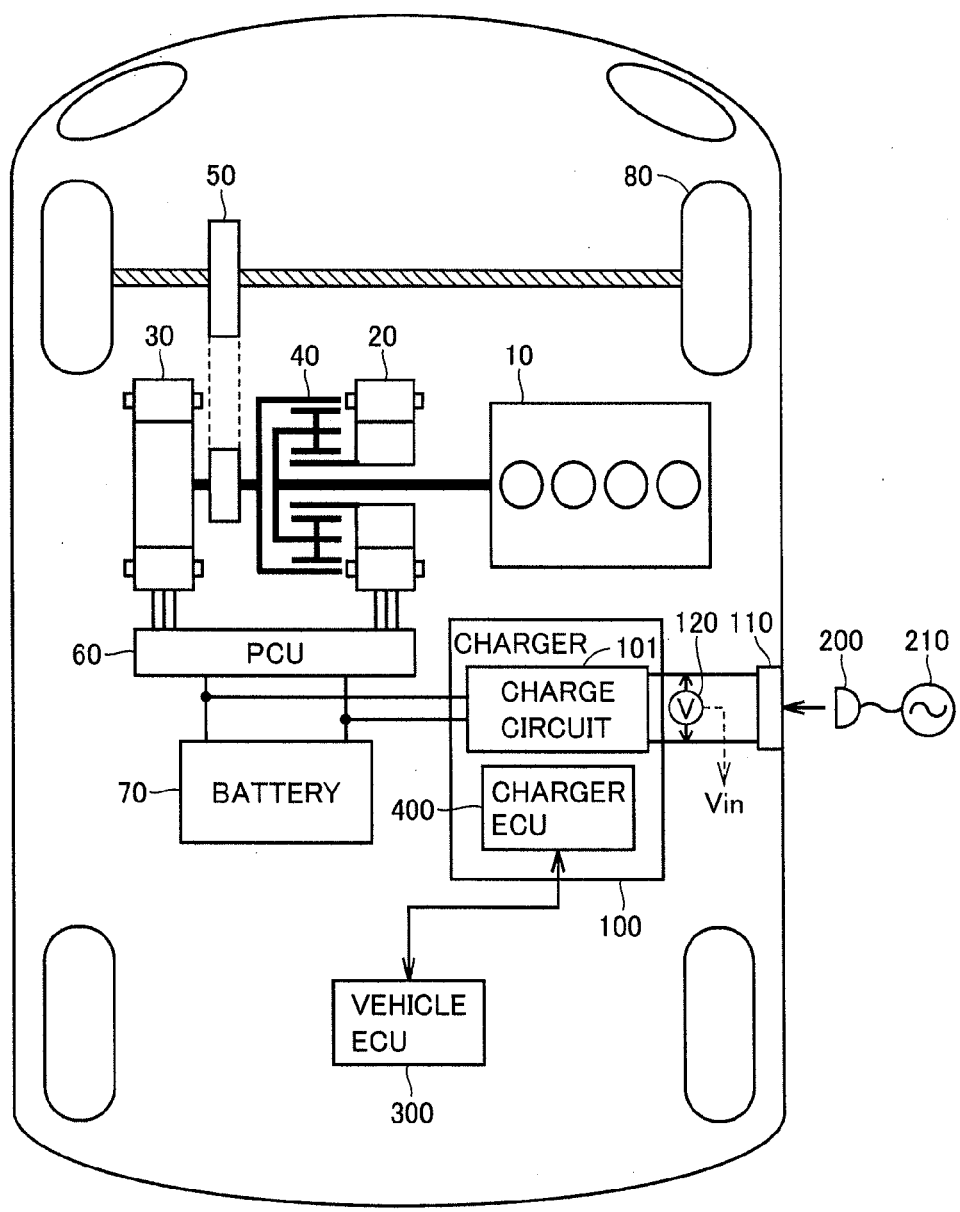
FIG. 1 is an entire block diagram of a vehicle.

Embodiments of the present invention will be described in detail hereinafter with reference to the drawings. In the drawings, the same or corresponding elements have the same reference characters allotted, and description thereof will not be repeated.

FIG. 1 is an entire block diagram of a vehicle 1 according to an embodiment of the present invention. Vehicle 1 is the so-called plug-in hybrid vehicle. Referring to FIG. 1, hybrid vehicle 1 includes an engine 10, a first MG (Motor Generator) 20, a second MG 30, a power split device 40, a reduction gear 50, a PCU (Power Control Unit) 60, a battery 70, a driving wheel 80, and a vehicle ECU (Electronic Control Unit) 300. Vehicle 1 further includes a charger 100 and a charge port 110.

Engine 10, first MG 20 and second MG 30 are coupled to power split device 40. Vehicle 1 runs by the driving force output from at least one of engine 10 and second MG 30. The power generated from engine 10 is divided into two paths by power split device 40, i.e. one which leads to driving wheel 80 via reduction gear 50, and the other which leads to first MG 20.

First MG 20 and second MG 30 are AC electric motors such as 3-phase AC synchronous electric motors. First MG 20 and second MG 30 are driven by PCU 60.

First MG 20 generates power using the power of engine 10 divided by power split device 40. The electric power generated by first MG 20 is converted into direct current from alternating current by PCU 60 to be stored in battery 70.

Second MG 30 generates the driving force using at least one of the electric power stored in battery 70 and the electric power generated by first MG 20. The driving force of second MG 30 is transmitted to driving wheel 80 via reduction gear 50.

In a braking operation or the like of the vehicle, second MG 30 is driven by the driving wheel 80 via reduction gear 50 to operate as a power generator. Accordingly, second MG 30 also functions as a regenerative brake converting the kinetic energy of the vehicle into electric power. The electric power generated by second MG 30 is stored in battery 70.

Power split device 40 is formed of a planetary gear including a sun gear, a pinion gear, a carrier, and a ring gear. The pinion gear engages with the sun gear and the ring gear. The carrier supports the pinion gear so as to be able to rotate about its own axis, and is coupled to the crankshaft of engine 10. The sun gear is coupled to the rotational shaft of first MG 20. The ring gear is coupled to the rotational shaft of second MG 30 and reduction gear 50.

PCU 60 receives the electric power from battery 70 to drive first MG 20 and second MG 30 based on a control signal from vehicle ECU 300. Based on the control signal from vehicle ECU 300, PCU 60 converts the AC power generated by first MG 20 and/or second MG 30 into DC power for output to battery 70.

Battery 70 is a rechargeable DC power supply, for example, a secondary battery such as of nickel-metal hydrogen, lithium ions, or the like. The voltage of battery 70 is approximately 200V, for example. Battery 70 stores, in addition to the electric power generated by first MG 20 and second MG 30, the electric power supplied from an external power supply 210, as will be described afterwards. A capacitor of large capacitance may also be employed as battery 70.

Charge port 110 is an electric power interface for receiving the AC power of external power supply 210 (hereinafter, referred to as "external power"). Charge port 110 is configured to allow connection of a connector 200 of external power supply 210.

Charger 100 includes a charge circuit 101 and a charger ECU 400. Charge circuit 101 is electrically connected to charge port 110 and battery 70. Charge circuit 101 is configured including a switching element or the like controlled by charger ECU 400. Charger ECU 400 carries out communication with vehicle ECU 300 to control the operation of charge circuit 101 such that the external power (AC power) is converted into DC power corresponding to the type suitable for charging battery 70 and then output to battery 70. Hereinafter, charging battery 70 with external power is also referred to as "external charging".

The voltage of the external power applied to charge circuit 101 (hereinafter, simply referred to as "input voltage Vin") is detected by voltage sensor 120. Voltage sensor 120 outputs the detected value of input voltage Vin to vehicle ECU 300 and charger ECU 400.

Charge circuit 101 is configured to stop when input voltage Vin becomes lower than a lower limit value of voltage that allows charge circuit 101 to operate (hereinafter, simply referred to as "operation lower limit value Vmin"). In the following, the stopping of charge circuit 101 in response to input voltage Vin becoming lower than operation lower limit value Vmin is also referred to as "forced stop". Charge circuit 101 is configured to be reactivated when input voltage Vin returns to a level greater than or equal to operation lower limit value Vmin. Such function of forced stopping and reactivation may be realized by hardware (for example, a dedicated electronic circuit provided at charge circuit 101), or by software (dedicated control by charger ECU 400).

Vehicle ECU 300 incorporates a CPU (Central Processing Unit) and a memory not shown to generate and provide to each device an instruction signal for controlling each device based on the information stored in the memory and the information from each sensor.

Charger ECU 400 controls charge circuit 101 based on an instruction signal from vehicle ECU 300. Although vehicle ECU 300 and charger ECU 400 are divided as separate units in FIG. 1, they may be integrated into one unit.

During external charging at vehicle 1 having the configuration set forth above, operation of charge circuit 101 under a state where the external power supply system (the path from external power supply 210 up to charger 100 in the external charge path) has a section where connection is insufficient or a section likely to be disconnected will cause voltage drop by the impedance increase at such sections. If this width of voltage drop is so great that input voltage Vin becomes lower than operation lower limit value Vmin, charge circuit 101 will repeat stopping and activation. Specifically, if input voltage Vin becomes lower than operation lower limit value Vmin and charge circuit 101 is forced to stop, current will no longer flow to the external power supply system, so that the voltage drop is resolved. Therefore, input voltage Vin returns to the normal value. Accordingly, input voltage Vin exceeds operation lower limit value Vmin to cause reactivation of charge circuit 101. By this reactivation, voltage drop caused by impedance increase occurs, so that input voltage Vin will become lower than operation lower limit value Vmin to cause charge circuit 101 to be forced to stop again. When such hunting of stopping and activation being repeated occurs, the state where the drop of input voltage Vin caused by an impedance error continues cannot be determined accurately.

Even in the case where the width of voltage drop is small and the aforementioned hunting does not occur, the continuing flow of current to the external power supply system will cause electric power that is proportional to the electric resistance and the square of the flowing current to be continuously consumed at the impedance increased section to cause generation of heat.

To solve these problems, the control device of the present embodiment carries out "first termination control" in which an impedance error is determined to terminate external charging when the state where the reduction width of input voltage Vin is exceeding a threshold value ΔV continues for a predetermined time. By this first termination control, current will no longer flow to the external power supply system, so that the heat generation at the impedance increased section is suppressed.

Further, the control device of the present embodiment carries out "current reduction control" in which charge circuit 101 is controlled such that the current flowing through the external power supply system is reduced when input voltage Vin falls down to a threshold voltage V1 that is higher than operation lower limit value Vmin by just a predetermined value. By carrying out the current reduction control, the current flowing through the external power supply system is reduced than that flowing before current reduction control is carried out to allow the width of the voltage drop at the impedance increased section to be reduced. Thus, the aforementioned hunting due to a sudden reduction in input voltage Vin can be avoided to ensure the time required for the first termination control.

Furthermore, in the case where hunting occurs due to "current reduction control" being disabled due to some cause, or when input voltage Vin cannot be detected due to an error or the like at voltage sensor 120, "first termination control" will not be carried out properly. In order to suppress heat generation at the impedance increased section even under such circumstances, the control device of the present embodiment carries out "second termination control" in which an impedance error is determined to terminate external charging when stopping and activation of charger 100 are repeated.

The present invention is characterized mainly in the execution of "first termination control", "current reduction control" and "second termination control". The following description is based on an exemplary case where "first termination control" and "second termination control" are carried out at vehicle ECU 300, and "current reduction control" is carried out at charger ECU 400.

Figure 2:
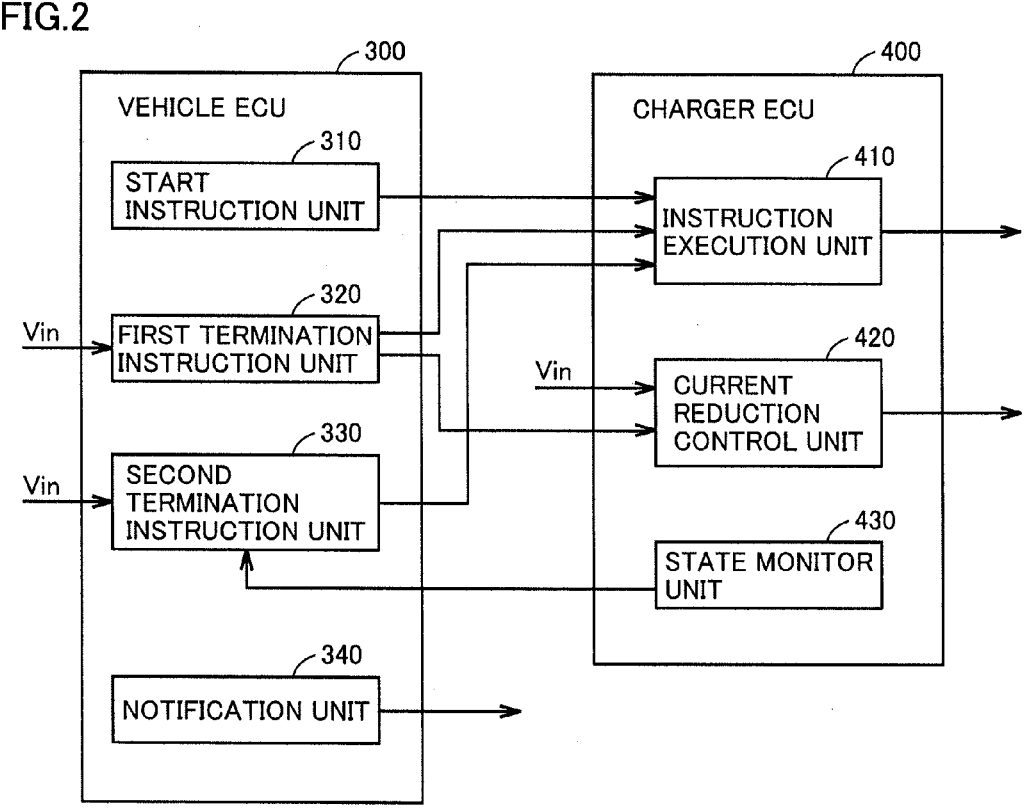
FIG. 2 is a functional block diagram of a vehicle ECU and a charger ECU.

FIG. 2 is a functional block diagram of vehicle ECU 300 and charger ECU 400 that are the control device of the present invention. Each functional block of FIG. 2 may be realized by hardware, or by software.

Vehicle ECU 300 includes a start instruction unit 310, a first termination instruction unit 320, a second termination instruction unit 330, and a notification unit 340. Charger ECU 400 includes an instruction execution unit 410, a current reduction control unit 420, and a state monitor unit 430.

When an external charging start condition including the condition of connector 200 being connected to charge port 110 is satisfied, start instruction unit 310 outputs an external charging start instruction to instruction execution unit 410. Instruction execution unit 410 receiving the external charging start instruction causes charge circuit 101 to operate to start external charging.

First termination instruction unit 320 monitors a reduction width (=|Vin−Vs|) of input voltage Vin from input voltage Vin immediately preceding the start of external charging (hereinafter, referred to as "start voltage Vs"), and determines that there is an impedance error when the state where the reduction width is exceeding a threshold width ΔV continues for a predetermined time to output the first termination instruction to instruction execution unit 410. Instruction execution unit 410 receiving the first termination instruction causes charge circuit 101 to stop to terminate external charging. Such series of control is the aforementioned "first termination control".

When input voltage Vin is reduced during external charging, second termination instruction unit 330 counts the number of times charge circuit 101 has stopped within a predetermined time starting from reduction in input voltage Vin, as the hunting count, based on a state signal from state monitor unit 430. When the hunting count exceeds a predetermined count, a determination is made that there is an impedance error, and a second termination instruction is output to instruction execution unit 410. Instruction execution unit 410 receiving the second termination instruction causes charge circuit 101 to stop to terminate external charging. Such series of control is the aforementioned "second termination control".

When first termination instruction unit 320 or second termination instruction unit 330 determines that there is an impedance error, notification unit 340 records that impedance error in a memory and notifies the user about the impedance error by displaying the recorded result at a display device not shown.

Instruction execution unit 410 controls charge circuit 101 according to each instruction from start instruction unit 310, first termination instruction unit 320, and second termination instruction unit 330, as set forth above.

Current reduction control unit 420 carries out the aforementioned "current reduction control". Specifically, current reduction control unit 420 monitors whether input voltage Vin has dropped down to a threshold voltage V1 that is higher than operation lower limit value Vmin by just a predetermined value, and controls charge circuit 101 such that, when input voltage Vin falls down to threshold voltage V1, the current flowing through the external power supply system is reduced to suppress further dropping of input voltage Vin. At this stage, current reduction control unit 420 carries out feedback control such that input voltage Vin during current reduction control is maintained in the vicinity of, for example, threshold voltage V1.

The executing time for current reduction control is limited to a constant period of time where first termination instruction unit 320 can determine that there is an impedance error. Specifically, in the case where first termination instruction unit 320 does not output a first termination instruction even when a constant period of time has elapsed from the start of current reduction control, current reduction control unit 420 causes charge circuit 101 to stop to terminate external charging. Thus, heat generation at the impedance increased section is suppressed even in the case where the "first termination control" is not carried out properly due to some cause.

State monitor unit 430 monitors the state of charge circuit 101 (operation and stop), and outputs a state signal indicating the monitored result to second termination instruction unit 330 and current reduction control unit 420.

Figure 3:
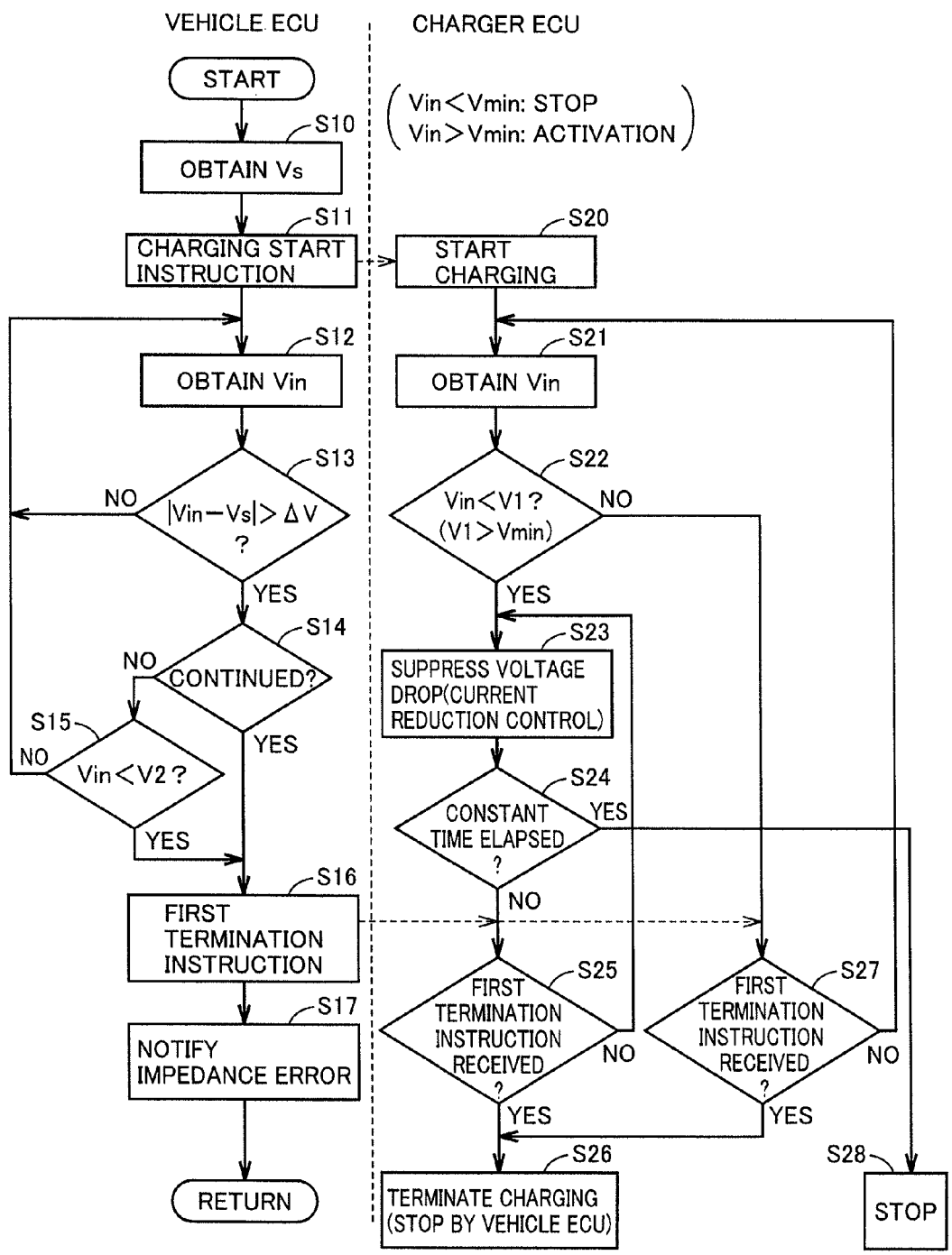
FIG. 3 is a first flowchart representing the processing procedure of the vehicle ECU and the charger ECU.

FIG. 3 is a flowchart of the processing procedure of vehicle ECU 300 and charger ECU 400 in the case where the aforementioned "first termination control" and "current reduction control" are executed. The flowchart of FIG. 3 is initiated when the external charging start condition is satisfied.

First, the processing procedure of vehicle ECU 300 will be described. At step (hereinafter, step is abbreviated as "S") 10, vehicle ECU 300 obtains and stores a start voltage Vs (input voltage Vin immediately preceding the start of external charging).

At S11, vehicle ECU 300 outputs a charging start instruction to charger ECU 400. At S12, vehicle ECU 300 obtains input voltage Vin.

At S13, vehicle ECU 300 determines whether a reduction width (=|Vin−Vs|) of input voltage Vin from that immediately preceding the start of external charging exceeds threshold width ΔV or not. When the reduction width does not exceed threshold width ΔV (NO at S13), control returns to S12. In the case where the width exceeds threshold width ΔV (YES at S13), control proceeds to S14.

At S14, vehicle ECU 300 determines whether the state of |Vin−Vs|>ΔV has continued for a predetermined time. At S15, vehicle ECU 300 determines whether input voltage Vin has become lower than threshold voltage V1.

When the state of |Vin−Vs|>ΔV continues for the predetermined time (YES at S14), vehicle ECU 300 proceeds to S16. An impedance error is determined, and the first termination instruction is output to charger ECU 400.

In the case where input voltage Vin becomes lower than a predetermined voltage V2 (YES at S15) even when the state of |Vin−Vs|>ΔV has not continued for the predetermined time (NO at S14), vehicle ECU 300 proceeds to S16. An impedance error is determined, and the first termination instruction is output to charger ECU 400. Predetermined voltage V2 is set to a value higher than operation lower limit value Vmin and lower than threshold voltage V1.

When the state of |Vin−Vs|>ΔV has not continued for the predetermined time (NO at S14) and input voltage Vin is not lower than threshold voltage V1 (NO at S15), vehicle ECU 300 returns the control to S12.

Following the determination of an impedance error at S16, vehicle ECU 300 proceeds to S17 to record and notify the user about an impedance error.

Next, the processing procedure of charger ECU 400 will be described hereinafter. Upon receiving a charging start instruction from vehicle ECU 300, charger ECU 400 causes charge circuit 101 to operate to start external charging at S20. At S21, charger ECU 400 obtains input voltage Vin.

At S22, charger ECU 400 determines whether input voltage Vin has become lower than threshold voltage V1. Threshold voltage V1 is set to a value higher than operation lower limit value Vmin by just a predetermined value, as set forth above.

When input voltage Vin has not dropped down to threshold voltage V1 (NO at S22), charger ECU 400 determines whether the first termination instruction has been received from vehicle ECU 300 at S27. In the case where the first termination instruction is received (YES at S27), charger ECU 400 proceeds to S26 to cause charge circuit 101 to stop to terminate external charging. In contrast, when the first termination instruction is not received (NO at S27), charger ECU 400 returns to S21.

When input voltage Vin has dropped to threshold voltage V1 (YES at S22), charger ECU 400 carries out the aforementioned current reduction control at S23.

At S24, charger ECU 400 determines whether the constant period of time has elapsed from the start of current reduction control.

When the constant period of time has not elapsed from the start of the current reduction control (NO at S24), charger ECU 400 proceeds to S25 to determine whether the first termination instruction is received from vehicle ECU 300.

When the first termination instruction is received (YES at S25), charger ECU 400 proceeds to S26 to terminate external charging according to the first termination instruction. In contrast, when the first termination instruction is not received (NO at S25), charger ECU 400 returns to S23 to continue the current reduction control.

In the case where the first termination instruction has not been received even when the constant period of time has elapsed from the start of current reduction control (YES at S24), charger ECU 400 proceeds to S28 to directly stop charge circuit 101 to terminate external charging.

Figure 4:
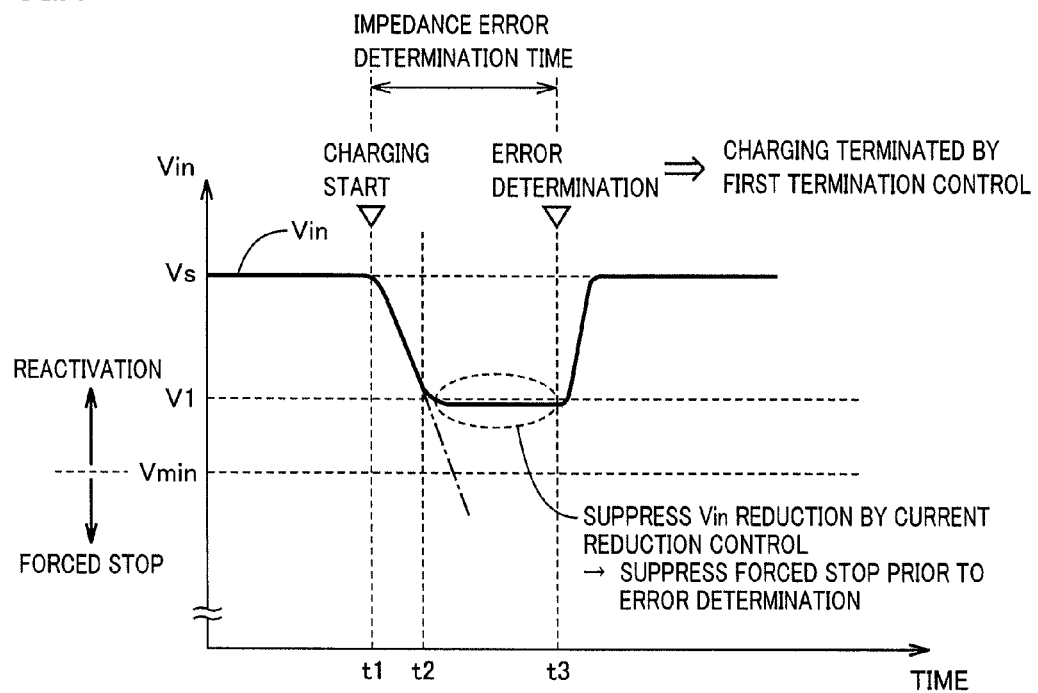
FIG. 4 is a first diagram representing temporal change in input voltage Vin.

FIG. 4 represents the temporal change in input voltage Vin when the current reduction control and the first termination control are executed. When external charging is started at time t1, input voltage Vin will begin to drop when there is an impedance increased section in the external charging system. Even in such a case, current reduction control is executed at time t2 where input voltage Vin becomes as low as threshold voltage V1 (that is, before input voltage Vin becomes lower than operation lower limit value Vmin) to suppress further reduction of input voltage Vin in the present embodiment. Therefore, the event of input voltage Vin becoming lower than operation lower limit value Vmin prior to a determination of an impedance error by the first termination control (refer to chain dotted line) to force charge circuit 101 to be stopped can be avoided. Thus, by executing current reduction control before input voltage Vin becomes lower than operation lower limit value Vmin during external charging, the impedance error determination time by the first termination control can be ensured.

When a determination is made that the state of |Vin−Vs|<ΔV has continued for the predetermined time by the first termination control at time t3, an impedance error is determined, and charger 100 is stopped by the first termination control. Therefore, no current flows to the external power supply system any longer, so that heat generation at the impedance increased section is suppressed.

Figure 5:
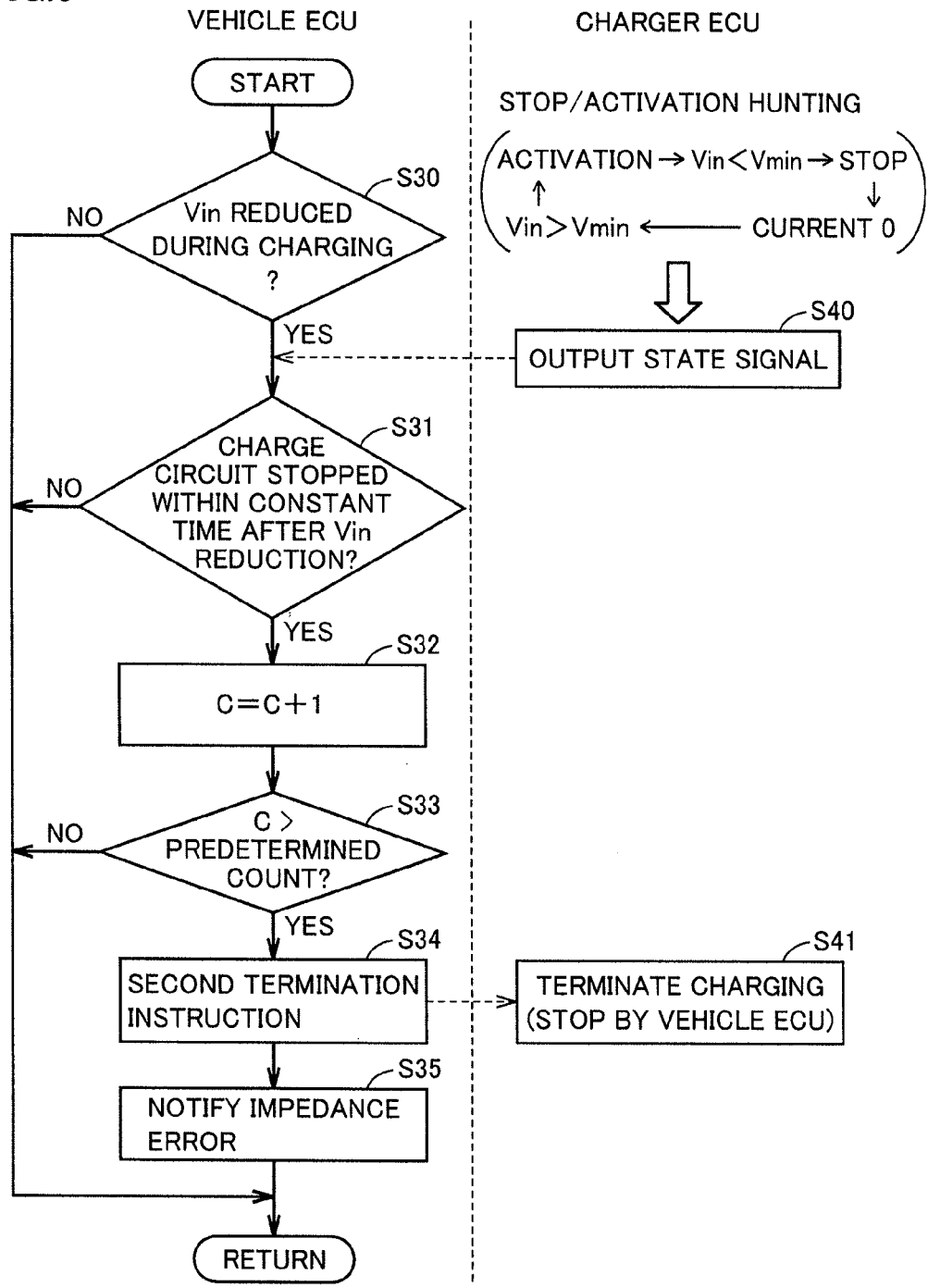
FIG. 5 is a second flowchart representing the processing procedure of the vehicle ECU and the charger ECU.

FIG. 5 is a flowchart of the processing procedure of vehicle ECU 300 and charger ECU 400 when the aforementioned "second termination control" is executed. The flowchart of FIG. 5 is executed at a predetermined cycle during external charging.

First, the processing procedure of vehicle ECU 300 will be described. At S30, vehicle ECU 300 determines whether input voltage Vin has been reduced during external charging. When input voltage Vin has not been reduced (NO at S30), the process ends.

When input voltage Vin has been reduced (YES at S30), vehicle ECU 300 proceeds to S31 to determine whether charge circuit 101 has been stopped or not within a constant period of time starting from reduction in input voltage Vin based on a state signal from charger ECU 400. When charge circuit 101 has not been stopped within the constant period of time starting from the reduction in input voltage Vin (NO at S31), the process ends.

When charge circuit 101 has been stopped within the constant period of time starting from the reduction in input voltage Vin (YES at S31), vehicle ECU 300 determines a forced stop of charge circuit 101 caused by input voltage Vin becoming lower than operation lower limit value Vmin due to an impedance error, and increments the hunting counter C by 1. The hunting counter C has an initial value of zero.

At S33, vehicle ECU 300 determines whether hunting counter C has exceeded a predetermined count. When hunting counter C has not exceeded the predetermined count (NO at S33), the process ends.

When hunting counter C exceeds the predetermined count (YES at S33), vehicle ECU 300 determines that there is an impedance error at S34 to output the first termination instruction to charger ECU 400.

Following the determination of an impedance error at S34, vehicle ECU 300 proceeds to S35 to record and notifies the user about the impedance error.

Next, the processing procedure of charger ECU 400 will be described. At S40, charger ECU 400 outputs a state signal indicating the state of charge circuit 101 (operation and stop) to vehicle ECU 300. At S41, charger ECU 400 terminates external charging according to the second termination instruction.

FIG. 6 represents the temporal change in input voltage Vin when the second termination control is executed. Upon initiating external charging at time t11, input voltage Vin begins to be reduced when there is an impedance increased section in the external charging system. When the above-described "current reduction control" is disabled due to some cause at this stage, input voltage Vin is further reduced to become lower than operation lower limit value Vmin at time t12, causing charge circuit 101 to stop. Accordingly, current no longer flows to the external charging system, so that input voltage Vin returns to the normal value. Therefore, charge circuit 101 is reactivated. By this reactivation, input voltage Vin becomes lower than operation lower limit value Vmin at time t13 again to cause charge circuit 101 to stop again.

Vehicle ECU 300 counts the number of times charge circuit 101 is forced to stop as hunting counter C, and determines that there is an impedance error at time t15 at which hunting counter C exceeds the predetermined count, causing charger 100 to stop by the second termination control. Therefore, heat generation at the impedance increased section can be suppressed even when the "current reduction control" is disabled by some cause and "first termination control" cannot be executed properly.

Thus, the control device according to the present invention carries out "first termination control" in which, when the state where the reduction width of input voltage Vin is exceeding threshold width ΔV continues for a predetermined time during external charging, a determination is made that there is an impedance error to terminate external charging. At this stage, in order to ensure the period of time for carrying out the first termination control, the control device of the present embodiment carries out "current reduction control" in which the current flowing through the external power supply system is reduced at the point in time when input voltage Vin drops down to threshold voltage V1 that is higher than operation lower limit value Vmin by just a predetermined value (before input voltage Vin becomes lower than operation lower limit value Vmin). Thus, the impedance error determination time for the first termination control can be ensured by this current reduction control. Thus, an impedance error in the external power supply system can be determined accurately based on the amount of reduction in input voltage Vin to terminate external charging, allowing heat generation at the impedance increased section to be suppressed appropriately.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 1 vehicle; 10 engine; 20 first MG; 30 second MG; 40 power split device; 50 reduction gear; 70 battery; 80 driving wheel; 100 charger; 101 charge circuit; 110 charge port; 120 voltage sensor; 200 connector; 210 external power supply; 300 vehicle ECU; 310 start instruction unit; 320 first termination instruction unit; 330 second termination instruction unit; 340 notification unit; 400 charger ECU; 410 instruction execution unit; 420 current reduction control unit; 430 state monitor unit.

The invention claimed is:

1. A control device for a vehicle including a power storage device and a charge circuit for carrying out external charging in which said power storage device is charged with a power supply external to the vehicle, said charge circuit being stopped when an input voltage applied to said charge circuit from said power supply drops to become lower than a lower limit voltage value at which said charge circuit can operate, said control device comprising:
a suppression unit executing suppression control for suppressing a drop of said input voltage before said input voltage becomes lower than said lower limit voltage value during said external charging, and
a first charge termination unit determining whether an impedance error is occurring at a charge path based on a reduction width of said input voltage during said external charging, and terminating said external charging when a determination is made that said impedance error is occurring,
said first charge termination unit determining that said impedance error is occurring when a state where the reduction width of said input voltage is exceeding a threshold width continues during said external charging, and
said suppression unit executing said suppression control for a predetermined time during which said first charge termination unit can determine that said impedance error is occurring.

2. The control device for a vehicle according to claim 1, wherein said suppression control includes control to reduce current flowing through said charge path when said input voltage drops down to a threshold voltage higher than said lower limit voltage value during said external charging.

3. The control device for a vehicle according to claim 1, wherein
said suppressing unit terminates said external charging when said external charging is not terminated by said first charge termination unit even after said predetermined time has elapsed from the start of said suppression control.

4. The control device for a vehicle according to claim 1, wherein said charge circuit is activated when said input voltage returns to a level greater than or equal to said lower limit voltage value,
said control device further comprising a second charge termination unit determining that there is said impedance error to terminate said external charging when stopping and activation of said charge circuit are repeated.

5. The control device for a vehicle according to claim 4, wherein said second charge termination unit determines that there is said impedance error to terminate said external charging when said input voltage is reduced during said external charging and a count of said charge circuit stopping within a predetermined time starting from reduction in said input voltage exceeds a predetermined count.

6. The control device for a vehicle according to claim 1, further comprising a notification unit notifying a user about said impedance error.

* * * * *